Figure 1:
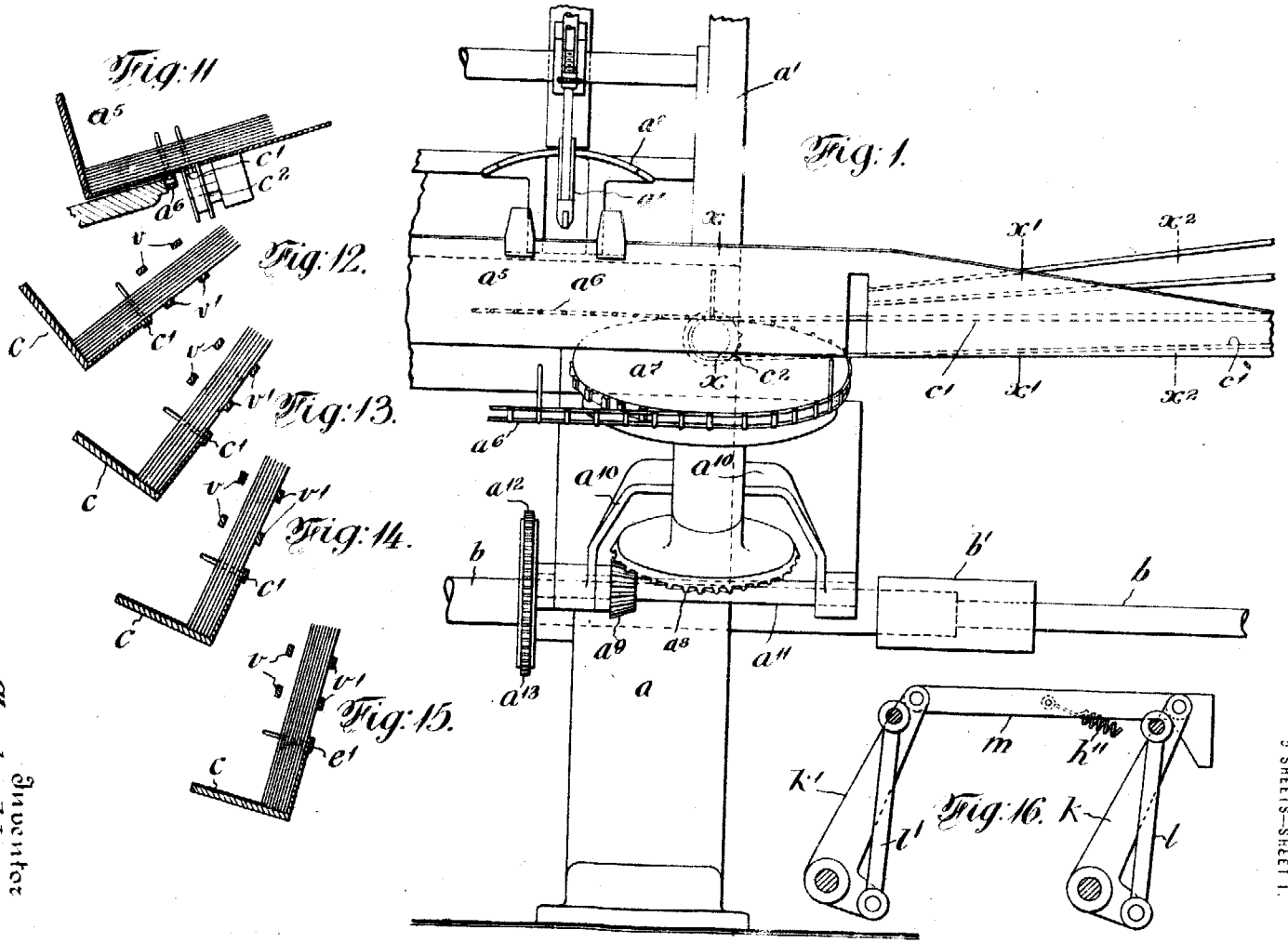

C. A. JUENGST.

SIGNATURE CONVEYING AND WIRE STITCHING MACHINE.

APPLICATION FILED MAY 5, 1915.

Reissued Aug. 24, 1915.

13,967.

5 SHEETS—SHEET 1.

Inventor
Charles A. Juengst

By his Attorney
Arthur Peeken

C. A. JUENGST.

SIGNATURE CONVEYING AND WIRE STITCHING MACHINE.

APPLICATION FILED MAY 5, 1915.

Reissued Aug. 24, 1915.

13,967.

5 SHEETS—SHEET 2.

Inventor
Charles A. Juengst
By his Attorney
Arthur Becker

C. A. JUENGST.
SIGNATURE CONVEYING AND WIRE STITCHING MACHINE.
APPLICATION FILED MAY 5, 1915.
Reissued Aug. 24, 1915.
13,967.
5 SHEETS—SHEET 3.
Fig. 8.
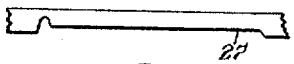
Fig. 10.
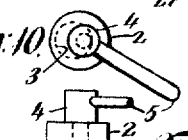
Fig. 9.
Fig. 3.
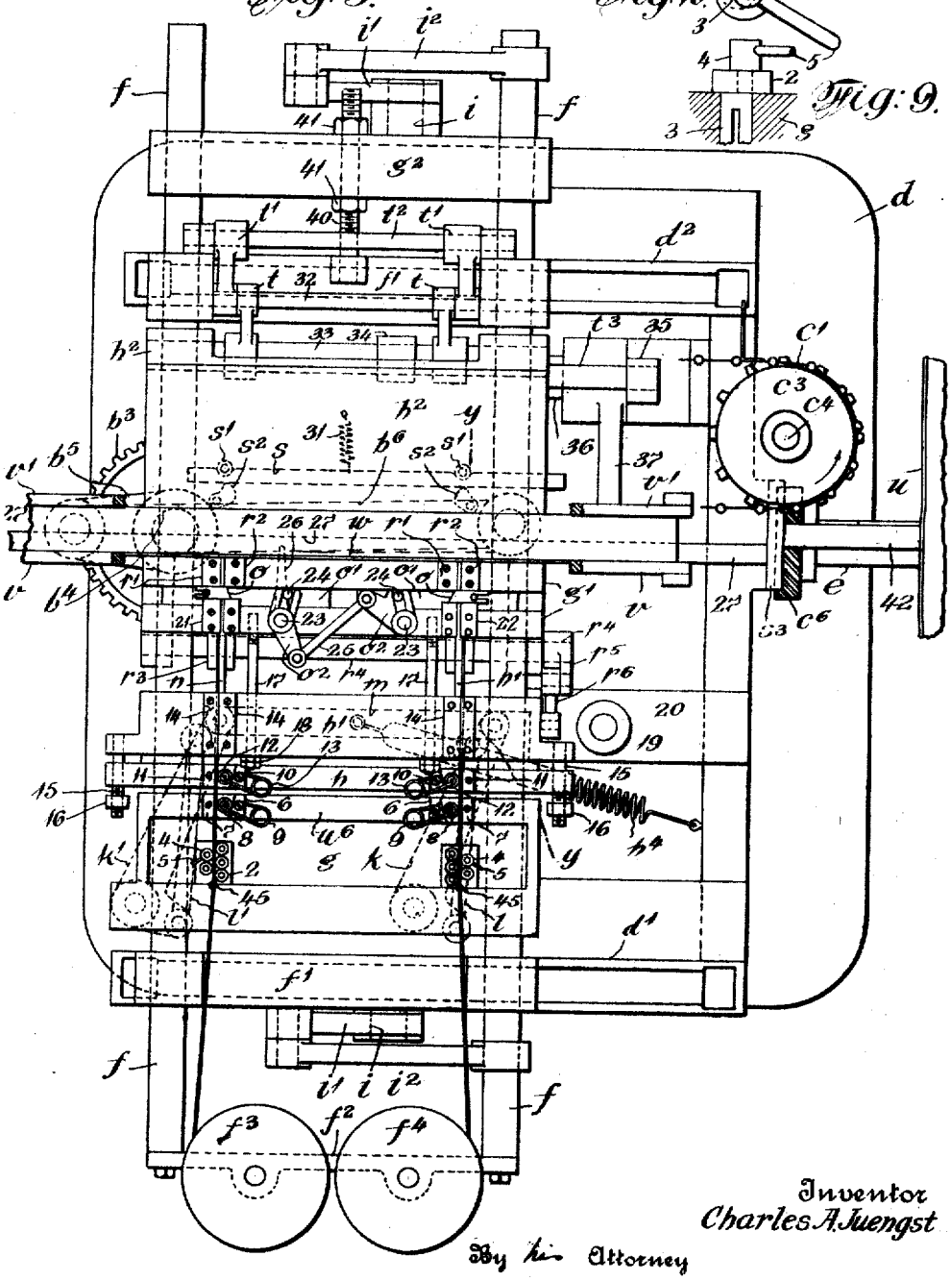
Inventor
Charles A. Juengst
By his Attorney
Arthur Becker

C. A. JUENGST.

SIGNATURE CONVEYING AND WIRE STITCHING MACHINE.

APPLICATION FILED MAY 5, 1915.

Reissued Aug. 24, 1915.

13,967.

5 SHEETS—SHEET 4.

Inventor
Charles A. Juengst
By his Attorney
Geo. H. Beckett

C. A. JUENGST.
SIGNATURE CONVEYING AND WIRE STITCHING MACHINE.
APPLICATION FILED MAY 5, 1915.
Reissued Aug. 24, 1915.
13,967.
5 SHEETS—SHEET 5.
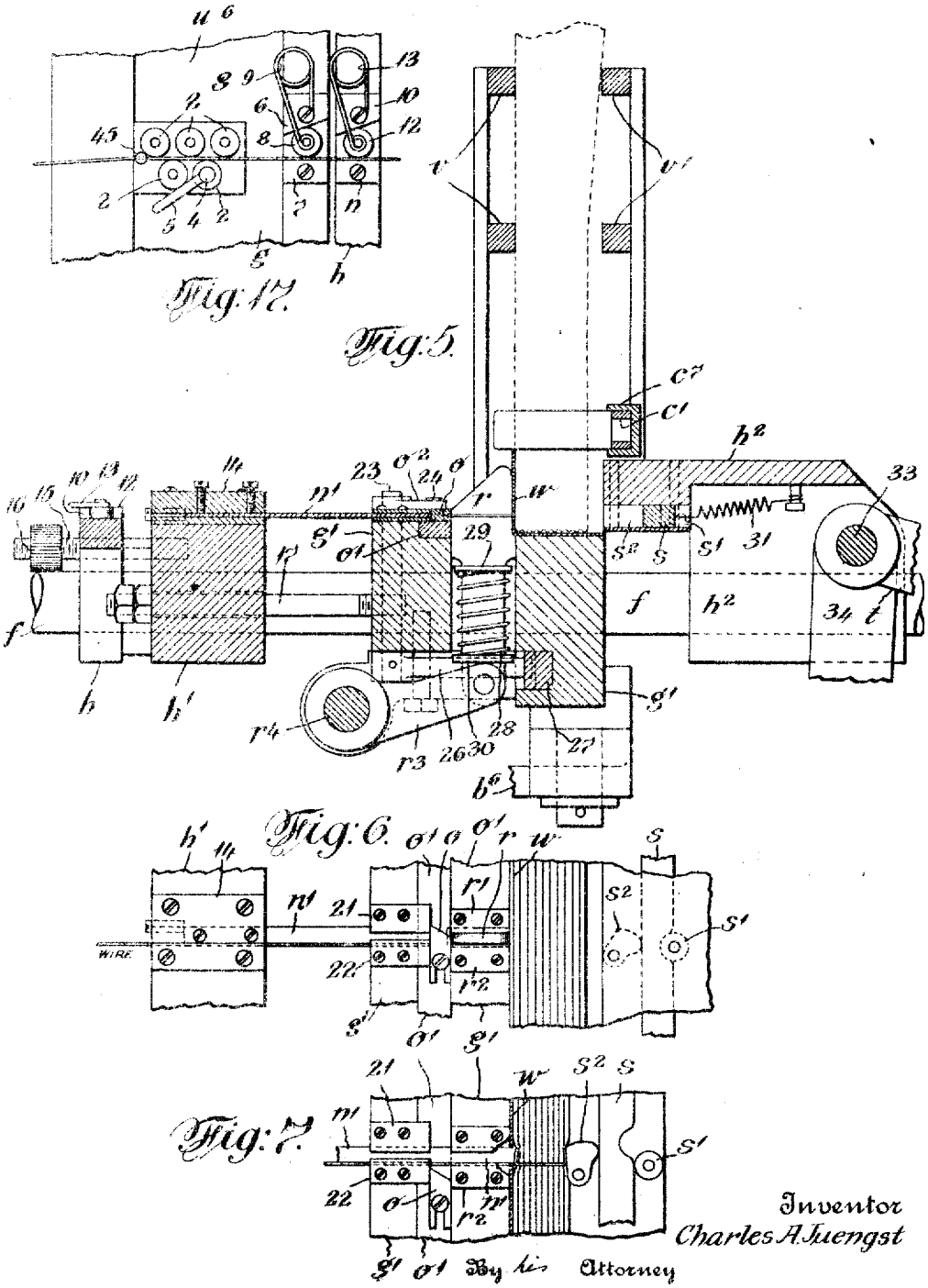
Inventor
Charles A. Juengst
By his Attorney
Arthur Becker

UNITED STATES PATENT OFFICE.

CHARLES A. JUENGST, OF CROTON FALLS, NEW YORK.

SIGNATURE-CONVEYING AND WIRE-STITCHING MACHINE.

13,967. Specification of Reissued Letters Patent. Reissued Aug. 24, 1915.

Original No. 846,323, dated March 12, 1907, Serial No. 262,324. Application for reissue filed May 5, 1915. Serial No. 26,163.

*To all whom it may concern:*

Be it known that I, CHARLES A. JUENGST, a citizen of the United States, residing at Croton Falls, in the county of Westchester and State of New York, have invented an Improvement in Signature-Conveying and Wire-Stitching Machines, of which the following is a specification.

My invention relates to devices for wire stitching or stapling groups of superimposed signatures or sheets in forming pamphlets, magazines, &c.; and it relates also to devices coacting therewith and for delivering thereto the said groups of signatures or sheets as collated by a signature-gathering machine, the object of my invention being to group in one machine the devices performing these functions, so that the work may be quickly and economically performed and without the signatures or sheets being handled by an attendant in transit from the gathering-machine to and through the wire-stitching machine.

In the machine of my improvement the devices of the wire stitching or stapling mechanism engaging the superimposed or collated signatures or sheets have a reciprocating movement in unison with or slightly greater than the feed movement of the superimposed or collated signatures or sheets as they are delivered from the signature-gathering machine, and the wire stitching or stapling is performed while the stitching or stapling mechanism is moving in one direction. Any such greater or accelerated movement of the devices for wire-stitching over the feed movement of the superimposed or collated signatures or sheets from the gathering-machine insures getting each mass of signatures or sheets out of the way of those following and provides for the return movement of the parts after the wire-stitching has been performed, so as to successively engage the masses of signatures or sheets and prevent their accumulation.

The signatures are usually superimposed by the gathering-machine in a slightly inclined position upon a conveyer, and as they are advanced toward the wire-stitching machine from the gatherer they are gradually turned into a vertical position, resting upon their folded-back edges. As received by the wire-stitching devices they are pressed tightly together and are so held while the wire staple is inserted and clenched in position. In an application for Letters Patent filed by me April 29, 1904, Serial No. 205,448, I have described and shown an analogous wire-stitching mechanism in which are embraced the essential devices for wire-stitching the signatures. The precise details of the devices of my present improvements, their arrangement, and operation are hereinafter more particularly set forth. These may be arranged to operate any desired number of staples at once.

Figure 2:
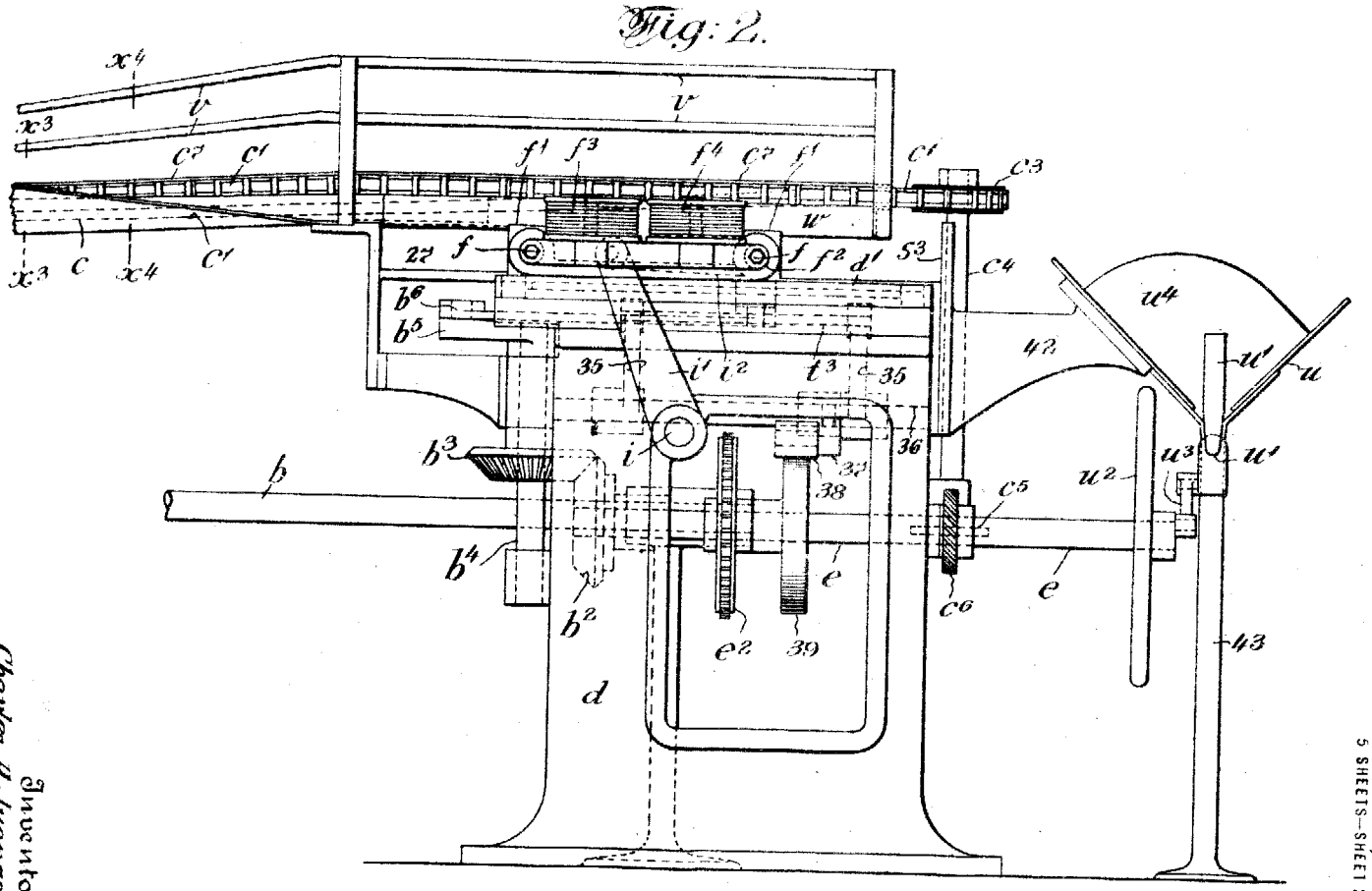
Figure 4:
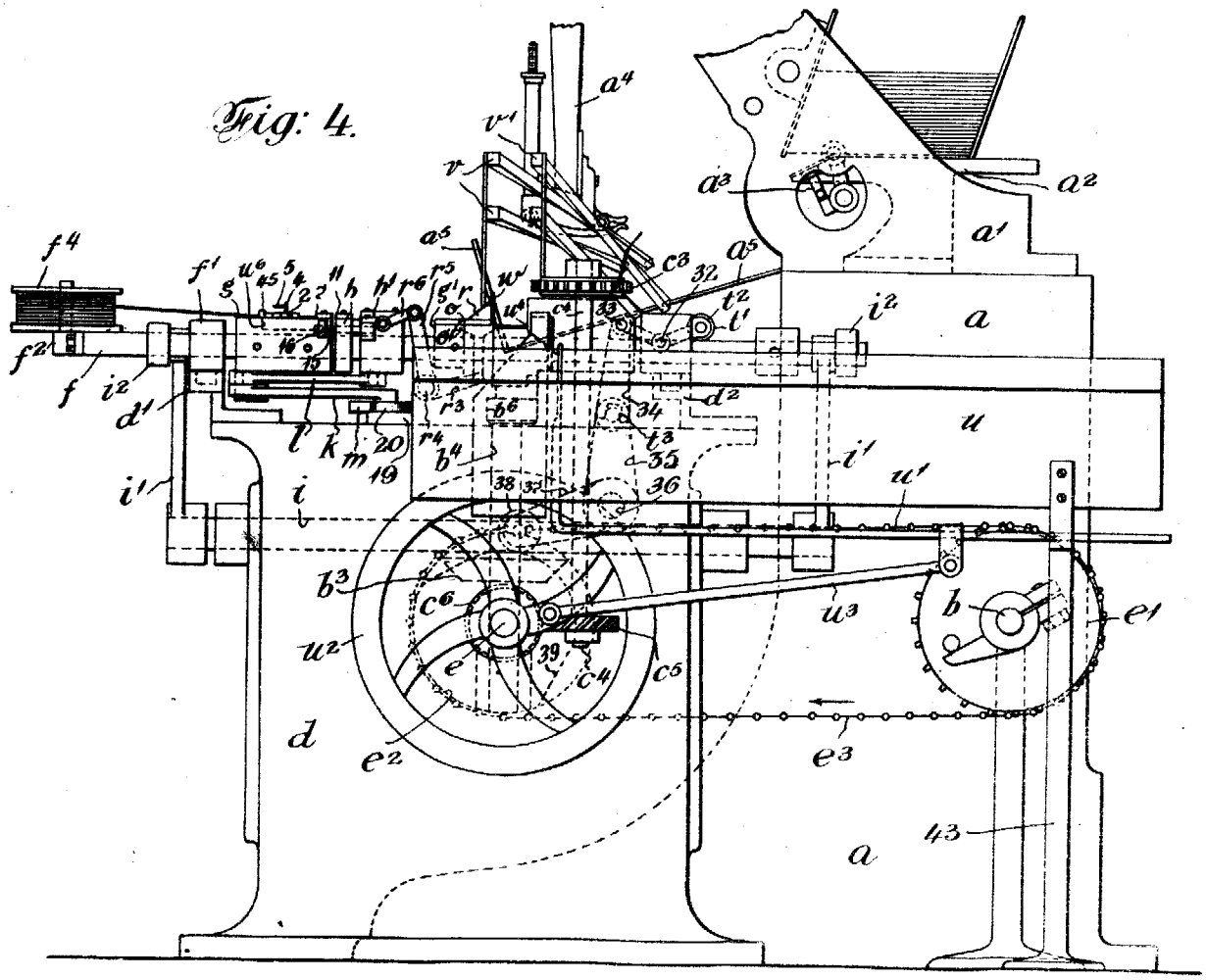

In the drawing, Figure 1 is an elevation at one end of a signature-gathering machine, illustrating a part of the devices for removing therefrom the signatures and sheets and conveying the same to the reciprocating wire-stitching mechanism. Fig. 2 is an elevation on the same scale as Fig. 1 and a continuation of the parts at the right hand of the devices, Fig. 1, showing the completion of the conveying mechanism and a general elevation of the wire-stitching devices. Fig. 3, on a slightly larger scale, is a plan of the wire-stitching mechanism as shown at the central portion of Fig. 2. Fig. 4, on a scale agreeing with Figs. 1 and 2, is an elevation of the devices at the right hand of Fig. 2. Fig. 5 is a vertical cross-section and elevation in large size at the dotted line *y y* of Fig. 3. Fig. 6 is a plan of parts shown in Fig. 5 in one position—that is, the position where the wire to form the staple has been cut and one end bent over against the die-blocks. Fig. 7 is a plan of the parts shown in Fig. 5 in the other position—that is, where the presser-bar has forced the wire staple through the group of signatures or sheets and the same has been clenched on the opposite side. Figs. 5, 6 and 7 are on the same scale. Fig. 8 is a plan of a stationary notched bar employed for operating the wire-cutters. Fig. 9 is an elevation, and Fig. 10 a plan, of one adjustable wire-straightening roller. Figs. 11 to 15, inclusive, are cross-sections of the signature and sheet-guide trough on the dotted lines $x$, $x'$, $x^2$, $x^3$, and $x^4$ of Figs. 1 and 2, along which the signatures and sheets are moved by an endless conveyer-chain from the signature-gathering machine to the reciprocating wire-stitching mechanism. Fig. 16 is a sectional plan of parts shown in Fig. 3 only by dotted lines and which parts actuate the devices for feeding along the wires from which the staples are formed; and Fig. 17 is a plan on the same scale as Fig. 6, representing the wire-straightening devices and part of the wire-feeding devices actuated by the mechanism illustrated in Fig. 16.

Referring particularly to Figs. 1, 2, and 3, $a$ represents a frame at one end of the signature-gathering machine; $a'$, a bracket mounted thereon and forming part of said machine; $a^2$, a plate-support for a group of signatures; $a^3$, a sucker device for bending down the lowermost signatures one at a time; $a^4$, a swinging gripper-arm adapted to engage the lowermost bent-down signature and remove the same and deliver it in the signature-trough $a^5$, in which it and other signatures previously superimposed are moved along by the pins of the conveyer-chain $a^6$ toward the right-hand end of the signature-gathering machine. At this end of the signature-gathering machine $a^7$ represents a sprocket or chain wheel around which the conveyer-chain $a^6$ passes. This sprocket or chain wheel $a^7$ is mounted on a shaft which passes through a sleeve of the bracket-support $a^{10}$, on the other end of which shaft is a bevel-gear $a^8$, meshing with a bevel-gear $a^9$ on a short shaft all in bearings also formed as part of this bracket-support. At one end of the short shaft $a^{11}$ is a sprocket $a^{12}$, and there is a second sprocket $a^{13}$ in line with the sprocket $a^{12}$, the latter upon the power-shaft $b$, said sprockets being connected by a chain, the power and rotation being communicated by the shaft $b$ through the sprockets $a^{13}$ and $a^{12}$ and the intervening parts described to the sprocket or chain wheel $a^7$ for driving the conveyer-chain $a^6$ and its pins. This power-shaft $b$ is provided with a coupling $b'$, receiving and secured to a smaller prolongation of said power-shaft, also carrying a reference letter $b$. The signature-guiding trough $c$, Figs. 1 and 2, is at its left-hand end connected to, and it forms a prolongation of the signature-trough $a^5$ and extends, as shown in Fig. 2, to the reciprocating wire-stitching devices. Moving along through this trough $c$ and in a guide $c^7$ is a conveyer-chain $c'$, with pins, which at one end passes around the pulley $c^2$, having suitable bearings, and at its other end around a sprocket $c^3$, secured to the upper end of a vertical shaft $c^4$, also in suitable bearings. At the lower end of the shaft $c^4$ there is a worm-wheel $c^5$, occupying a horizontal position and meshing with a worm-wheel $c^6$ on an auxiliary shaft $e$, horizontally placed and in suitable bearings in the bed-frame $d$ of the wire-stitching devices. Conveyer-chains $a^6$ and $c'$ are so timed in their movements with respect to each other that as a pin upon the chain $a^6$ passes away from the completed book of signatures a pin upon the chain $c'$ is in position to take said book of signatures and convey the same from the trough $a^5$ to the trough $c$.

The power-shaft $b$ is provided with a sprocket $e'$ (see Fig. 4) and said auxiliary shaft $e$ with a sprocket $e^2$, a chain $e^3$ passing around said sprockets, so as to communicate the power and rotation from the shaft $b$ to the shaft $e$ and from the shaft $e$, through the worm-wheels $c^5$ $c^6$, to the shaft $c^4$ and sprocket $c^3$ to move the conveyer-chain $c'$ and progress the superimposed piles of signatures or sheets from the signature-gathering machine to the reciprocating wire-stitching devices. Fig. 11 on the dotted line $x$ $x$ of Fig. 1 shows the general inclination of the signature-trough $a^5$ at the end of the gathering-machine, and the trough $c$ continues this inclination; but, as illustrated in Figs. 12 to 15, inclusive, this trough $c$ is so bent as it progresses in length that the piles of signatures or sheets are gradually turned from an inclined into an almost vertical position. In fact, they do come into a vertical position, as shown in Fig. 5, at the place where the wire stitching or stapling is performed, and in this position the stitched signatures rest upon their folded-back edges, and I provide in connection with the signature-guiding trough $c$ guide bars or racks $v$ $v'$ in pairs coming at opposite sides of the signatures. The guide bars are fixed with respect to the trough $c$ (Figs. 2, 4 and 12–15), and conform to the curve of the trough $c$, so that the signatures or sheets in their movement rest alike on said bars or racks and on the trough.

The bed-frame $d$ of the reciprocating wire-stitching devices is shown particularly in Figs. 2, 3, and 4. It is provided at opposite edges with parallel bracket-slideways $d'$ $d^2$. These are in the form of grooves, preferably with enlarged ends, so that oil may be filled into the ends more or less to be taken up at each movement by the parts sliding therein. The reciprocating frame of the wire-stitching devices essentially comprises the round parallel bars $f$ $f$, the cross-bars $f'$ $f'$, formed to receive said parallel bars and on their under portions to fit and move in the slideways $d'$ $d^2$ of the bed. At one end $f^2$ is a fixed cross-bar with apertures to receive the pins of the spools of wire $f^3$ $f^4$. $g$, $g'$, and $g^2$ represent parallel fixed cross-bars at right angles to the parallel bars $f$ $f$ and through which said bars pass, the said cross-bars being pinned to the bars $f$ $f$, and thus securely held, so that the parts are obliged to move together. $h$ $h'$ represent movable cross-bars, and $h^2$ a movable presser-bar, said bars being parallel with each other and with the bars $g$, $g'$, and $g^2$ and at right angles to the bars $f$ $f$, through which said bars $f$ $f$ pass. $h'$ represents a helical spring secured at one end to the bed and at the other end to the under side of a bar $m$.

Upon the left-hand end of the auxiliary shaft $e$ there is a bevel gear $b^2$, which meshes with a bevel-gear $b^3$ on a vertical shaft $b^4$ in bearings secured to the bed of the machine. At the upper end of this shaft $b^4$ there is a crank $b^5$, (see Figs. 2 and 3,) and a link $b^6$ is at one end secured to the free end of said crank and at its other end to the under side of the fixed cross-bar $g'$. The shaft $b$ is provided with suitable bearings in the bed of the machine and occupies a position at right angles to the shaft $e$ and auxiliary shaft $e$. This is an idle shaft, upon the respective ends of which are cranks $b'$, and links $b^7$ are at one end connected to the cranks $b'$ and at their other ends to one parallel bar $f$. By these devices—that is, by the bevel-gears $b^2$ $b^3$, shaft $b^4$, crank $b^5$, and link $b^6$—a reciprocating movement is imparted to the wire stitching or stapling devices upon the bed-frame $d$, the series of fixed cross-bars and movable cross-bars and the parts associated therewith upon the parallel bars $f$ $f$ sliding across the bed in the slideways $d'$ $d^2$, these parts being compelled to move in unison and with an even true reciprocation, because of the cranks $b'$ and the links $b^7$, which with the shaft $b$ engage and control the respective ends of the reciprocating frame and compel the even movement thereof, during which movement the slide-bars $f'$ $f'$ in the slideways $d'$ $d^2$ gather oil from the end pockets, so as to insure the full lubrication of the slideways during the movement.

Upon the fixed cross-bar $g$ there are series of straightening-rollers 2 2, between which the wires from the spools $f^3$ $f^3$ pass and are straightened in their movement. One or more of these rollers is adjustable for increasing the tension or pressure on the wire. This roller is illustrated in Figs. 9 and 10, in which 3 is the pin passing down into the cross-bar $g$ and provided with a hub 4 and with a contracted neck between the hub and the pin placed eccentric to the axis of the pin. The hub 4 is provided with a handle 5, by which the hub, neck, and pin are turned in the socket in the cross-bar $g$ so as to bring the roller 2 nearer to or take the same farther from the rollers associated therewith, so as to vary the applied pressure. On the fast cross-bar $g$ there are holdback gripping devices for the wire, each of which comprises an inclined face-block 6 and a straight face-block 7, the faces of which are separated a distance agreeing substantially with the diameter of the roller 8. A coil-spring 9 has two free ends, one of which is fastened to the inclined face-block 6 by a screw and the other to the bearing-pin of the roller 9, and the wire passes between the straight face-block and the roller, and the function of the roller is to grip the wire against the flat face-block and prevent any return or back movement of the wire which might occur with the return movement of other parts hereinafter described.

On the movable cross-bar $h$ there are wire gripping devices substantially the same as those just described upon the cross-bar $g$—that is, there are inclined face-blocks 10, straight face-blocks 11, rollers 12, and springs 13 with the wire passing between the straight face-blocks and the rollers and the function of these latter devices is to grip the wire with a forward movement of the movable cross-bar $h$ so as to compel the wires to feed with the cross-bar and to pull the same through between the straightening-rollers 2 and through between the straight face-blocks 7 and rollers 8. Upon the movable cross-bar $h'$ there are guide-blocks 14 for the wires and through which the wires pass, and these guide-blocks also serve as supports and places of attachment for the plunger-bars $n$ $n'$.

The movable cross-bar $h'$ is made with offset ends, in which are secured stems 15, threaded near their ends where they pass through the ends of the movable cross-bar $h$, and nuts 16 are upon the threaded ends of said stems adapted for adjustment as hereinafter described. The fixed cross-bar $g'$ is provided with stems 17, which pass through the movable cross-bar $h'$ and on which stems there are lock-nuts 18, the said stems and lock-nuts limiting the movement in one direction of the movable cross-bars $h$, $h'$.

I employ two bell-crank levers $k$ $k'$. (See especially Figs. 3 and 4.) These levers are pivoted to the under side of the fixed cross-bar $g$, and to the short ends of said bell-crank levers are pivotally connected links $l$ $l'$, the other ends of said links being pivotally connected to the under side of the movable cross-bar $h'$. The long ends of the bell-crank levers $k$ $k'$ are pivotally connected to a bar $m$ beneath the movable cross-bar $h'$, the right-hand end of which bar $m$ is of increased width, (see Fig. 16,) and I provide a plate 19, secured to the bed-frame $d$ of the machine and provided with a roller 20, against which during the movements of the devices the broadened end of the bar $m$ is adapted to strike and in its arrested position and with the reciprocating movement of the parts hereinbefore described to swing the bell-crank levers $k$ $k'$ and impart a movement to the movable cross-bars $h$ $h'$ longitudinally of the parallel bars $f$ $f$ and with said movement to draw along the wires by virtue of the grip of the rollers 12 (Fig. 17) a distance predetermined by the position occupied by the nuts 16 on the stems 15, the movement being shorter or longer, according to the position of the said nuts.

The plunger-bars $n$ $n'$, secured upon the movable cross-bar $h'$ by the guide-blocks 14, pass through between guides 21 22 on the fixed cross-bar $g'$. This fixed cross-bar $g'$ is grooved longitudinally to receive the cutter-bars $o'$, upon which are adjustably positioned cutters $o$ $o$, which can be set and held in position by the clamping-screws, shown especially in connection therewith in Figs. 6 and 7. Pivotally mounted upon the upper surface of the fixed cross-bar $g'$ are rocker-bars $o^2$, 23 being the pivots of the rocker-bars. These rocker-bars are of the peculiar form shown in Fig. 3, with jaws to receive the pins 24 in the cutter-bars $o'$, said rocker-bars being connected for opposite movement by a link 25, whose ends are pivotally connected to said rocker-bars. The pin 23 of the left-hand rocker-bar, as it appears in Fig. 3, passes completely down through the fixed cross-bar $g'$, and on the lower end thereof there is secured an arm 26, whose free end bears against a portion of a bar 27, which is fixed at a convenient point to the bed-frame $d$ of the machine. Fig. 8 shows a portion of this bar 27, which is provided with a notch and a recessed portion, the free end of the bar 26 traveling along the recessed portion with a part of the movement of the reciprocating devices and engaging the notch of said bar, so as to swing the cutter-bars $o'$ from the position of the cutter-bar in Fig. 7 to the position of the cutter-bar in Fig. 6, and in so doing to cut off the wire to form the staple and simultaneously turn over the cut end of the wire at right angles to the portion of the wire that is already within the guide-blocks $r'$ $r^2$.

As the cutters $o$ sever the wires and continue their movement they turn the ends cut off against the die-blocks $r$ $r$, the same being at right angles, as just stated, to the portions of the wires that are already in the guide-blocks $r'$ $r^2$. These die-blocks $r$ $r$ (see especially Figs. 5 and 6) are narrow and are adapted for vertical movement between the guide-blocks $r'$ $r^2$ in ways that are formed in the fixed cross-bar $g'$. The lower portions of these die-blocks $r$ $r$ are reduced and are each provided with a helical spring 28 between disks 29 and 30, (see Fig. 5) and the lower ends of said die-blocks are provided with an elongated slot receiving the pins which connect said die-blocks to the cranks $r^3$. These cranks $r^3$ are on a shaft $r^4$, the bearings of which (see Fig. 5) extend toward and are secured to the fixed cross-bar $g'$. At one end of the shaft $r^4$ there is a crank-arm $r^5$ and link $r^6$, (see Figs. 3 and 4,) the free end of the link being pivotally connected to the movable cross-bar $h'$, from which it will be apparent that when this cross-bar $h'$ is moved along the parallel bars $f$ $f$, as hereinbefore described, that the connection therewith of said link $r^6$ and crank-arm $r^5$ will rock the shaft $r^4$, swinging the crank $r^3$ and drawing down the die-blocks $r$ $r$. This movement is to be timed with the movement of the plunger-bars $n$ $n'$, so that after the wires are cut and the staples formed by bending the ends against said die-blocks and the presser-bars bear against the ends of the staples to force the same into the superimposed signatures or sheets that the die-blocks draw down as the presser-bars move forward, the staples sliding up over the inclined upper ends of the die-blocks, said die-blocks performing the essential function of assisting in maintaining these ends of the staples true while the pointed end is being forced through the signature and as an anvil against which the staple is pushed forward.

Within or just beneath the movable cross-bar $h^2$ is placed a bar $s$, provided with notches to receive the rollers $s'$, which rollers are pivoted to the said cross-bar $h^2$, and I provide dogs $s^2$, also pivoted to the under side of the movable cross-bar $h^2$ and coming between the face of the bar $s$ opposite the notched face and the surface of the superimposed signatures or sheets as they rest in the guide-way against a fence $w$. I provide a post $s^3$ on the frame of the machine, against which with the reciprocation of the parts the right-hand end of the bar $s$ strikes and which when arrested is moved longitudinally to a sufficient extent to throw the bar out of the notches receiving the rollers and bring the rollers onto the flat face of the bar and in so doing to swing the dogs $s^2$. As these dogs are swung with the timed movement of the parts they come against the ends of the wire staples protruding from the signatures of the magazine, and the movement of the dogs bends these protruding ends down flat and tight against the outer surface of the outermost signature of the magazine, clenching the same firmly in position and in so doing binding or wire-stitching the magazine.

$t$ $t'$ are toggle-bars pivotally connected to the shaft $t^2$, the ends of which are in bearings on the cross slide-bar $f'$. The joint of the toggle-bars is made to a toggle-shaft 32 and the free ends of the toggle-bars are connected to a shaft 33, to which they are keyed. This shaft 33 is in bearings in the movable cross-bar $h^2$, and to said shaft is connected a link 34, extending downward in the machine. The end of the link 34 connected to the shaft 33 is keyed thereto the same as the ends of the toggle-bars $t$ $t$, which are connected to the said shaft 33, and I provide cranks 35, secured to a shaft 36 in bearings in the frame of the machine.

The upper ends of the cranks 35 are connected by a cross-bar $t^3$, and the lower end of the link 34 is notched to receive said cross-bar and is movable along the cross-bar $t^3$ with the reciprocatory movement of the parts.

A crank 37, fast on the shaft 36, (see Fig. 4,) extends toward the left hand and is provided with a roller 38, running on the periphery or bearing-surface of a cam 39, secured on the auxiliary shaft $e$, and with the rotation of this auxiliary shaft $e$ and the cam 39 the roller 38 and crank 37 swing the shaft 36 and the cranks 35 and through the engagement of the link 34 with the cross-bar $t^3$ rock the shaft 33 in its bearings in the movable cross-bars $h^2$. This movement from the position of the parts shown in Fig. 4 straightens the toggle-bars, and as one end of the toggle-bars is fastened to the cross-bar $f'$ it follows that the straightening of the toggles must move the cross-bar $h^2$ and this movement is toward the receptacle for the superimposed signatures or sheets to be bound, and the action of said parts is to come in contact with the back surface of the signatures or sheets and press the same tightly against the fence $w$, and this pressure is exerted coincident with the movement of forcing the wire staples through the superimposed signatures or sheets, and the pressure is maintained in the timed movement of the parts until the right-hand end of the bar $s$ strikes the post $s^3$ and swings the dogs $s^2$ to overturn and clench the staples in position. The spring 31, at one end secured to the cross-bar $h^2$ and at the other end to the bar $s$, serves to return the bar $s$ to the initial position shown in Fig. 3 when this pressure is released and the dogs $s^2$ are free therefrom.

I provide a threaded bar 40, at one end secured in a boss on the upper surface of one slide-bar $f'$, and this threaded bar passes through the fixed cross-bar $g^2$ and is provided with nuts 41 thereon at opposite sides of the cross-bar $g^2$ in order that the adjustment of the wire-stitching devices may be provided to accommodate pamphlets or magazines of different thicknesses—that is, of different numbers of signatures and sheets—this adjustment being mainly apparent at the part shown particularly in Fig. 5, because where the pamphlet or magazine is of a less number of sheets and the parts are adjusted the loose cross-bar $h^2$ would then be brought nearer to the cross-bar $g'$, thus reducing the space between the fence $w$ and the adjacent and opposite face of the cross-bar $h^2$, and where a larger pamphlet is to be provided for the adjustment in the other direction will take the fence $w$ away from the face of the cross-bar $h^2$. I provide and have shown in Figs. 2 and 4 a trough $u$, supported at one end by a bracket 42 on the side of the machine and at the other end by a post 43, secured to the floor. This trough in cross-section is of broadened-V form and is so placed that the superimposed signatures or sheets as stitched by the reciprocating stitching mechanism are delivered directly from the machine into the trough. I have shown and prefer to employ a reciprocating finger-bar $u'$ and packer-plate $u^3$ secured thereto, moving through the trough and actuated by a link $u^2$, at one end pivoted to the finger-bar and at the other end to a fly-wheel $u^1$ on the end of the axle-shaft $e$. This device with the movement of this auxiliary shaft feeds the pamphlets or magazines along through the trough to make way for others that are coming from the stitching mechanism.

I have shown in Figs. 3 and 17 studs 45 on the fixed cross-bar $g$ in proximity to the series of straightening-rollers 2. These studs are perforated, and the wires to be cut up in forming the staples pass through these studs, so as to insure them passing between the straightening-rollers 2 without any tendency to come away from said rollers because of the line of draft from the spools $f^3$ $f^4$.

In the general operation of the machine as the superimposed signatures and sheets are collated by the signature-gathering machine, part of which is shown in Fig. 1, they are moved along the signature-trough $a^5$ by the conveyer-chain $a^6$ and are periodically engaged by the conveyer-chain $c'$ with pins and moved along the signature-guiding trough $c$, their inclination being progressively increased toward the vertical, as shown in Figs. 11 to 15. As they reach the reciprocating wire stitching or stapling devices they come into vertical position, as shown in Fig. 5, between the fence $w$ and the movable cross-bar $h^2$. Pressure is applied not only to hold but to consolidate the signatures and sheets by the toggle-bars $t$ $t'$, which are in pairs and which are actuated, as hereinbefore described, by the link 34 traveling along the cross-bar $t^3$ at the upper ends of the cranks 35, the cranks being fast upon a shaft 36 and actuated by the crank 37, roller 38, and cam 39 upon the auxiliary shaft $e$. This movement of the link 34 on the bar $t^3$ permits of the reciprocation of the wire-stitching devices and at the same time makes possible the action of the mechanism—that is, the toggle-bars—for gripping and at the same time holding the superimposed signatures and sheets. As hereinbefore described, the wire-stitching devices are reciprocated by the auxiliary shaft $e$, by bevel-wheels revolving the shaft $b^4$, and by the crank $b^5$ and link $b^6$, the movement being insured and steadied by the shaft $i$, cranks $i'$, and links $i^2$, the wire feeding movement being effected by the bell-crank levers $k$ $k'$, which are pivoted to the fixed cross-bar $g$, the links $l'$, connected to their short ends and pivoted to the movable cross-bar $h'$, and the bar $m$, pivoted to the long ends of the bell-crank levers coming against the fixed stop or roller 20.

The devices for feeding the wires along and for preventing back movement have also been described, as have the plunger-bars $n$ $n'$, which act upon the staples after the same have been formed by the cutters severing the wire and turning the end over against the die-blocks $r$ $r$, the staples thereafter being forced by said plunger-bars through the guide-blocks $r'$ $r^2$ and through the superimposed signatures or sheets and clenched on the opposite side by the dogs $s^2$ being actuated by the bar $s$ when the same strikes the post $s^3$. As the reciprocating wire-stitching devices come to the right hand of Fig. 3 and at each movement thereof in said direction a book is delivered into the trough $u$. These reciprocating devices are returned to an initial position likewise by the shaft $b^4$, crank $b^5$, and link $b^6$, and in said return movement the spring $h^4$, acting upon the bar $m$, returns the bell-crank-lever devices (shown in Fig. 16) to an initial position in which the wires while held by the gripping devices 6, 7, 8, and 9 are reëngaged by the gripping devices 10, 11, 12 and 13 for a new hold on the wire, and the bar 27, acting upon the arm 26 and the parts hereinbefore described and connected therewith, serves to return to an initial position the cutters ready to repeat the operations hereinbefore described.

While I have shown in the drawing two wires and devices acting thereon to form them into staples, it may be remarked that the devices of my improvement are equally applicable for any number of associated devices, so that the signatures and sheets forming a book may be connected by two or more staples, as desired.

The fixed cross-bar $g$ is recessed at $u^6$ in its upper face (see Figs. 3, 4, and 17) to receive cotton-waste and oil. The wires as they pass from the reels $f^3$ $f^4$ take up sufficient oil as they pass through or come in contact with the cotton-waste to lubricate the same and the parts through and between which the wires pass.

I claim as my invention—

1. The combination with devices for delivering groups of collated signatures, of a stitching mechanism having a rectilinear reciprocating movement acting in unison with the movement of the groups of signatures.

2. The combination with devices for delivering groups of collated signatures, of a wire-stitching mechanism having a rectilinear reciprocating movement acting in unison with the movement of the groups of signatures.

3. The combination with devices for delivering groups of collated signatures, of a stitching mechanism having a rectilinear reciprocating movement in line with the direction of delivery of the collated signatures and acting in unison with the movement of the groups of signatures.

4. The combination with devices for delivering groups of collated signatures, of a stitching mechanism having a reciprocating movement acting in line with the movement of the groups of signatures, and means for imparting to the stitching mechanism a speed slightly greater than that of the collated signatures as delivered.

5. The combination with devices for progressively delivering spaced-apart groups of collated signatures or sheets, of a wire-stitching mechanism having a rectilinear reciprocating movement acting in unison with the movement of the groups of signatures.

6. The combination with devices for delivering groups of collated signatures progressively from a signature-gathering machine, of a wire-stitching machine, intermediate conveyer devices, and means associated with the latter devices for gradually turning the signatures from an approximately horizontal to a substantially vertical position.

7. The combination with devices for de livering groups of collated signatures progressively from a signature-gathering machine, of a reciprocating wire-stitching machine, intermediate conveyer devices, and means associated with the latter devices for gradually turning the signatures from an approximately horizontal to a substantially vertical position.

8. The combination with devices for delivering groups of collated signatures progressively from a signature-gathering machine, of a wire-stitching machine, intermediate conveyer devices, means associated with the latter devices for gradually turning the signatures from an approximately horizontal to a substantially vertical position, and means for engaging and holding the groups of collated signatures with pressure.

9. The combination with devices for delivering groups of collated signatures or sheets progressively from a signature-gathering machine, of a conveyer device acting in unison with the devices for collating and delivering the groups as collated and by which the said groups are forwarded from the collating-machine, and a wire-stitching mechanism to which said groups are brought by said devices, said wire-stitching mechanism having a rectilinear reciprocating movement acting in unison with the movement of the collated groups of signatures and sheets.

10. The combination with devices for delivering groups of collated signatures or sheets progressively from a signature-gathering machine, of a conveyer device acting in unison with the devices for collating and delivering the groups as collated and by which the said groups are forwarded from the collating-machine, a wire-stitching mechanism to which said groups are brought by said devices, said wire-stitching mechanism having a reciprocating movement acting in unison with the movement of the collated groups of signatures and sheets, and means for engaging and holding the respective groups of signatures and sheets with pressure during the wire-stitching operation.

11. The combination with devices for delivering groups of collated signatures or sheets progressively from a signature-gathering machine, and a reciprocating wire-stitching mechanism, of an intermediate conveyer mechanism receiving the groups of signatures and sheets from the aforesaid delivering devices as delivered, and which moves in unison therewith, a signature-guiding trough and co-acting guide-racks associated therewith and which trough and racks are so constructed as to gradually turn from an inclined to a substantially vertical position, performing the function of turning the respective collated groups of signatures and sheets in transit from an inclined to a substantially vertical position in which they stand on their folded back edges.

12. In a signature-gathering machine, and in combination, means for supporting spools of wire, guides for the wire, means for progressively feeding the wire, means for severing the wire into lengths and forming staples, means for forcing said staples through groups of collated signatures or sheets, means for clenching the staples on the opposite side thereof, a common frame supporting all the aforesaid means, a supporting-bed and guides, and means for reciprocating said frame and devices upon the guides of said bed.

13. In a signature-gathering machine and in combination, means for supporting spools of wire, guides for the wire, means for progressively feeding the wire, means for severing the wire into lengths and forming staples, means for forcing said staples through groups of collated signatures or sheets, means for clenching the staples on the opposite side thereof, means for imparting a pressure to the groups of signatures or sheets simultaneous with the stapling operation, a common frame supporting all the aforesaid means, a supporting-bed and guides, and means for reciprocating said frame and devices upon the guides of said bed.

14. In a signature-gathering machine, and in combination, means for supporting spools of wire, guides for the wire, means for progressively feeding the wire, means for severing the wire into lengths and forming staples, means for forcing said staples through groups of collated signatures or sheets, means for clenching the staples on the opposite side thereof, the relations of the aforesaid movable parts being adjustable in proportion to the known thickness of the superimposed signatures or sheets, a common frame supporting the aforesaid devices, a supporting-bed and guides, and means for reciprocating said frame and devices upon the guides of said bed.

15. In a conveying and stapling machine, the combination with devices for delivering groups of collated signatures or sheets progressively from a signature-gathering machine, of a signature-guiding trough $e$ forming a prolongation of the delivering devices of the signature-gathering machine, a conveyer-chain $c'$ with pins moving along said trough and acting in conjunction with the delivering devices of the signature-gathering machine, and guide-racks $v$, $v'$, said trough and guide-racks being constructed so as to turn the signatures or sheets from an inclined into a substantially vertical position with their movement.

16. In a conveying and stapling machine, the combination with devices for delivering groups of collated signatures or sheets progressively from a signature-gathering machine, of a signature-guiding trough $e$ forming a prolongation of the delivering devices of the signature-gathering machine, a conveyer-chain $c'$ with pins moving along said trough and acting in conjunction with the delivering devices of the signature-gathering machine, guide-racks $v$, $v'$, said trough and guide-racks being constructed so as to turn the signatures or sheets from an inclined into a substantially vertical position with their movement, and a guide for the conveyer-chain $c'$ extending along the signature-guiding trough $e$ so as to keep the signatures and sheets away from contact with the moving chain.

17. In a conveying and stapling machine, the combination with a conveyer-chain, a signature-trough and a sprocket $a^1$, around which the chain passes and located at one end of the machine, of a signature-guiding trough $e$ connected against and forming a substantial prolongation of the aforesaid signature-trough, a pulley $c^2$ adjacent to the sprocket $a^1$, and a second conveyer-chain $c'$ with pins passing around said pulley so as to receive the superimposed signatures or sheets from the first mentioned conveyer-chain, and sprockets for said second conveyer-chain angularly disposed with respect to one another, whereby the conveyer-chain $c'$ is given a twist in its line of movement.

18. In a conveying and stapling machine, the combination with a conveyer-chain, a signature-trough and a sprocket $a^1$ around which the chain passes and located at one end of the machine, of a signature-guiding trough $c$ connected against and forming a substantial prolongation of the aforesaid signature-trough, a pulley $c^2$ adjacent to the sprocket $a^7$, a conveyer-chain $c'$ with pins passing around said pulley so as to receive the superimposed signatures or sheets from the aforesaid conveyer-chain, and sprockets for said second conveyer-chain angularly disposed with respect to one another, whereby the conveyer-chain $c'$ is given a twist in its line of movement, a guide $c^3$ for the conveyer-chain $c'$ and guide-racks $v$, $v'$, said guide and guide-racks being provided with twisted portions so as to turn the signatures or sheets from an inclined into an approximately vertical position.

19. In a conveying and stapling machine, the combination with a signature-guiding trough $c$, of a part $g'$ forming a substantial continuation thereof, guide-racks $v$, $v'$ between which the signatures and sheets move, a conveyer-chain $c'$ with pins, a fence or back support $w$, a movable cross-bar $h^2$ adapted to come against the face of the signatures or sheets opposite to that of the fence $w$, and means for actuating said cross-bar for compressing the signatures or sheets.

20. In a conveying and stapling machine, the combination with a signature-guiding trough $c$, of a part $g'$ forming a substantial continuation thereof, guide-racks $v$, $v'$ between which the signatures and sheets move, a conveyer-chain $c'$ with pins, a fence or back support $w$, a movable cross-bar $h^2$ adapted to come against the face of the signatures or sheets opposite to that of the fence $w$, means for actuating said cross-bar for compressing the signatures or sheets, and means for progressively stapling said signatures or sheets as thus held and means for clenching the staples.

21. In a conveying and stapling machine, the combination with a signature-guiding trough $c$, of a part $g'$ forming a substantial continuation thereof, guide-racks $v$, $v'$ between which the signatures and sheets move, a conveyer-chain $c'$ with pins, a fence or back support $w$, a movable cross-bar $h^2$ adapted to come against the face of the signatures or sheets opposite to that of the fence $w$, means for actuating said cross-bar for compressing the signatures or sheets, a shaft 33 in the movable cross-bar $h^2$, a pair of toggle-bars connected thereto and to a fixed part of the machine, a link 34, a shaft 36, cranks 35 movable therewith, a bar $t^3$ carried by said cranks and having a slidable connection with the link 34, a crank 37, a cam 39 acting thereon, and an auxiliary shaft $e$ on which is placed the cam 39 for actuating said toggle-bars and effecting the movement of the cross-bar $h^2$.

22. In a conveying and stapling machine, the combination with a signature-guiding trough $c$, of a part $g'$ forming a substantial continuation thereof, guide-racks $v$, $v'$ between which the signatures and sheets move, a conveyer-chain $c'$ with pins, a fence or back support $w$, a movable member $h^2$ adapted to come against the face of the signatures or sheets opposite to that of the fence $w$, means for actuating said cross-bar for compressing the signatures or sheets, a shaft 33 in the movable member $h^2$, a pair of toggle-bars connected thereto and to a fixed part of the machine, a link 34, a shaft 36, cranks 35 movable therewith, a bar $t^3$ carried by said cranks and having a slidable connection with the link 34, a crank 37, a cam 39 acting thereon, an auxiliary shaft $e$ on which is placed the cam 39 for actuating said toggle-bars and effecting the movement of the member $h^2$, a power-shaft $b$, a sprocket on the power-shaft, and a sprocket on said auxiliary shaft, and a chain $e^3$ connecting said sprockets and shafts for communicating the power of the power-shaft $b$ through the auxiliary shaft to said movable parts.

23. In a conveying and stapling machine, a frame comprising parallel bars $f$, $f$, slide-bars $f'$, $f'$ supporting the same, a fixed cross-bar $f^2$ at one end, spools of wire $f^3$, $f^4$ mounted on said cross-bar $f^2$, fixed cross-bars $g$, $g'$, $g^2$ on the bars $f$, $f$, movable cross-bars $h$, $h'$, $h^2$ also on said parallel bars $f$, $f$, and devices carried by said frame for feeding the wire, forming the staples and effecting the wire stitching of superimposed signatures or sheets.

24. In a conveying and stapling machine, a frame, comprising parallel bars $f$, $f$, slide-bars $f'$, $f'$ supporting the same, a fixed cross-bar $f^2$ at one end, spools of wire $f^3$, $f^4$ mounted on said cross-bar $f^2$, fixed cross-bars $g$, $g'$, $g^2$ on the bars $f$, $f$, movable cross-bars $h$, $h'$, $h^2$ also on said parallel bars $f$, $f$, devices carried by said frame for feeding the wire, forming the staples and effecting the wire stitching of superimposed signatures or sheets, and series of coacting devices supplying power and for effecting the movement of said parts.

25. In a conveying and stapling machine, a series of reciprocating stitching devices, devices for actuating the same, a sliding support on which the same are moved, a shaft $i$, cranks $i'$, and links $i^2$ for causing an even reciprocation of said stitching devices.

26. In a conveying and stapling machine, the combination with a bed-frame $d$ and bracket-slideways $d'$, $d^2$ of slide-bars $f'$, $f'$ in said slideways, parallel bars $f$, $f$ passing through said slide-bars $f'$, $f'$, wire-stitching devices and coacting parts carried thereby.

27. In a conveying and stapling machine, the combination with a series of reciprocating wire-stitching devices, devices forming a receptacle for superimposed signatures or sheets, a fixed member coming against one side of said signatures or sheets, a movable member adapted to be brought against the other side, pairs of toggles for actuating the movable member, a bar $t^3$, a link having a slidable relation with said bar and at its other end connected to the toggle devices, and means for swinging the said link for actuating the movable member by the toggles.

28. In a conveying and stapling machine, the combination with a series of reciprocating wire-stitching devices, devices forming a receptacle for superimposed signatures or sheets, a fixed member coming against one side of said signatures or sheets, a movable member adapted to be brought against the other side, pairs of toggles for actuating the movable member, a bar $t^3$, a link having a slidable relation with said bar and at its other end connected to the toggle devices, cranks 35, a shaft 36 carrying the same, said cranks carrying said bar $t^3$, a crank 37, a cam 39 acting thereon, and an auxiliary shaft for said cam.

29. In a conveying and wire-stapling machine, a series of reciprocating wire-stitching devices, a fixed member $g$, movable members $h$, $h'$, a stop device 20, and intermediate devices actuated in one direction by the said stop and pivoted to the said member $g$ for moving the said members $h$, $h'$ to feed the wire.

30. In a conveying and wire-stapling machine, the combination with a series of reciprocating wire-stitching devices, of a member $g$ fixed thereto, bell-crank levers $k$, $k'$ pivoted to the under side of the member $g$, movable wire-feeding members $h$, $h'$, means for connecting the same, links $l$, $l'$ connected at their ends to the movable member $h'$ and at their other ends to the short arms of the bell-crank levers, a bar $m$ to which the long arms of said bell-crank levers are pivotally connected, and a roller-stop 20 and spring $h^4$ for actuating said bar, substantially as set forth.

31. In a conveying and stapling machine, the combination with reciprocating wire-stitching devices, of a fixed bar 27 recessed and notched, a cutter $o$ and cutter-bar $o'$, a pin 24 on the cutter-bar, an arm 26, and a shaft 23 at one end connected with the arm 26 and at its other end having a rocker-bar $o^2$ engaging the pin 24 by which devices the said cutter and cutter-bar are moved with the reciprocation of the wire-stitching devices.

32. In a conveying and stapling machine, the combination with reciprocating wire-stitching devices, of a fixed bar 27 recessed and notched, a series of cutters and cutter-bars, pivots 23, rocker-bars $o^2$, pins 24 in the cutter-bars engaging the rocker-bars, a link 25 between similar ends of the rocker-bars, and an arm 26 connected to one of said pivots 23 and at its free end coming in contact with the fixed bar 27 in the said recess and notch thereof for effecting the movements of the cutter-bars with the movement of the reciprocating devices.

33. In a conveying and stapling machine, the combination with a fixed part or bar $g'$ having a vertical slot, of guide-blocks $r'$, $r^2$ thereon at opposite sides of the vertical slot, a die-block in the vertical slot between the guide-blocks the upper end of said die-block being tapered, means for drawing down said die-block, and devices for returning the same to an initial position.

34. In a conveying and stapling machine, the combination with a fixed part or bar $g'$, having a vertical slot, of guide-blocks $r'$, $r^2$ thereon at opposite sides of the vertical slot, a die-block in the vertical slot between the guide-blocks, the upper end of said die-block being tapered, a shaft $r^4$, a crank $r^5$ connected thereto and to the lower end of the die-block, a crank-arm $r^6$ and link $r^7$ for moving the die-block down, and a spring 33 for returning the die block to an initial position.

35. In a conveying and stapling machine, the combination with a fixed part or bar $g'$ having a vertical slot, of guide-blocks $r'$, $r^2$ thereon at opposite sides of the vertical slot, a die-block in the vertical slot between the guide-blocks, the upper end of said die-block being tapered, means for drawing down said die-block, devices for returning the same to an initial position, a fence $w$ bearing against a face of the die-block and acting as a support for the superimposed signatures or sheets at one side, a support for the signatures or sheets at the opposite side, a cutter $o$ and cutter-bar $o'$, a plunger-bar for acting upon the staple as cut, and guide-blocks between which the staple passes as forced by the plunger-bar over the inclined upper end of the die-block as the same is drawn down.

36. In a conveying and stapling machine, the combination with a fixed member $g'$, of a fence $w$ adjacent to the upper surface of said fixed member and against which one side of superimposed signatures or sheets bear, means at the other side of the signatures or sheets to hold them in position, means for forming and forcing wire staples through the signatures or sheets, a bar $s$ connected to the said first means and having notches, rollers $s'$ normally resting in said notches, means for moving said bar longitudinally, and dogs $s^2$ actuated by the movement of said bar $s$ to clench the staples.

37. In a conveying and stapling machine, the combination with a fixed member $g'$, a fence $w$ adjacent to the upper surface thereof and against which one side of superimposed signatures or sheets bear, means at the other side of the signatures or sheets to hold them in position, means for forming and forcing wire staples through the signatures or sheets, a bar *s* connected to the said first means and having notches, rollers *s'* normally resting in said notches, means for moving said bar longitudinally, dogs $s^2$ actuated by the movement of said bar for clenching the staples, and a spring 31 at one end connected to the bar *s* and at its other end secured to said first means and normally acting to keep the rollers *s'* in the notches of said bar.

38. The combination with devices for automatically delivering groups of collated signatures, of a stitching mechanism including means for engaging and holding each group of signatures as progressively delivered, and means for moving the stitching mechanism along with the groups of collated signatures while the stitching is being performed.

39. The combination with devices for delivering groups of collated signatures, of a reciprocating stitching mechanism, and means moving therewith for engaging and holding each group of signatures as progressively delivered while the stitching is being performed.

40. The combination with devices for progressively delivering groups of collated signatures, of a stitching mechanism having a movement in unison with the intermittent reciprocating movement of the groups of signatures.

41. The combination with devices for automatically progressively delivering groups of collated signatures of a wire-stitching mechanism having a movement in unison with the movement of the groups of signatures.

42. The combination with devices for delivering groups of collated signatures, of a stitching mechanism having a movement in line with the direction of delivery of the collated signatures and acting in unison with the movement of the groups of signatures.

43. The combination with devices for delivering groups of collated signatures, of a stitching mechanism having a movement in line with the movement of the groups of signatures and means for imparting to the stitching mechanism a speed slightly greater than that of the collated signatures as delivered.

44. The combination with devices for delivering groups of signatures progressively from a signature gathering machine, of a clamp for the signature group, means for uniting the signatures of a group while thus clamped, intermediate conveyer devices for transferring the signature groups from the delivery devices to the clamp, and means for automatically closing the clamp on the signature group.

45. The combination with devices for delivering groups of signatures progressively in a substantially horizontal position from a signature gathering machine, of a clamp for holding a signature group in a substantially vertical position, means for uniting the signatures of a group while thus clamped, intermediate conveyer devices for transferring the signature groups from the delivery devices to the clamp and for, at the same time, turning the signature group from a substantially horizontal position to a substantially vertical position, and means for automatically closing the clamp on the signature group.

46. The combination with devices for delivering groups of folded signatures progressively in a substantially horizontal position from a signature gathering machine, of a clamp for holding a signature group in a substantially vertical position with their folded back edges lowermost, means for uniting the signatures of a group at their folded back edges while thus clamped, intermediate conveyer devices for transferring the signature groups from the delivery devices to the clamp and for, at the same time, turning the signature group from a substantially horizontal position to a substantially vertical position with their folded back edges lowermost, and means for automatically closing the clamp on the signature group.

47. The combination with devices for delivering groups of signatures progressively from a signature gathering machine, of a traveling clamp for the signature group, means for uniting the signatures of a group while thus clamped, intermediate conveyer devices for transferring the signature groups from the delivery devices to the clamp, and means for automatically closing the clamp on the signature group.

48. The combination with devices for delivering groups of signatures progressively in a substantially horizontal position from a signature gathering machine, of a traveling clamp for holding a signature group in a substantially vertical position, means for uniting the signatures of a group while thus clamped, intermediate conveyer devices for transferring the signature groups from the delivery devices to the clamp and for, at the same time, turning the signature group from a substantially horizontal position to a substantially vertical position, and means for automatically closing the clamp on the signature group.

49. The combination with devices for delivering groups of folded signatures progressively in a substantially horizontal position from a signature gathering machine, of a traveling clamp for holding a signature group in a substantially vertical position with their folded back edges lowermost, means for uniting the signatures of a group at their folded back edges while thus clamped, intermediate conveyer devices for transferring the signature groups from the delivery devices to the clamp and for, at the same time, turning the signature group from a substantially horizontal position to a substantially vertical position with their folded back edges lowermost, and means for automatically closing the clamp on the signature group.

Signed by me this 30th day of April, 1915.

CHARLES A. JUENGST.

Disclaimer in Letters Patent Reissue No. 13,967.

DISCLAIMER.

13,967. (Reissue.)—*Charles A. Juengst*, Croton Falls, N. Y. SIGNATURE-CONVEYING AND WIRE-STITCHING MACHINE. Patent dated August 24, 1915. Disclaimer filed March 6, 1919, by the patentee and the assignee, *George Juengst & Sons*.

Enter this disclaimer—

"To that part of the claim in said specification which is in the following words:

"Claim 44. The combination with devices for delivering groups of signatures progressively from a signature gathering machine, of a clamp for the signature group, means for uniting the signatures of a group while thus clamped, intermediate conveyer devices for transferring the signature groups from the delivery devices to the clamp, and means for automatically closing the clamp on the signature group."

[*Official Gazette March 11, 1919.*]